US012633547B2

(12) United States Patent
 Seidel

(10) Patent No.: US 12,633,547 B2
(45) Date of Patent: May 19, 2026

(54) METHOD FOR PRODUCING A FUNCTIONALIZED STRUCTURIZED COMPOSITION FOR A FUEL CELL AND MEMBRANE ELECTRODE ASSEMBLY

(71) Applicant: AUDI AG, Ingolstadt (DE)

(72) Inventor: Karsten Seidel, Eichstätt (DE)

(73) Assignee: AUDI AG, Ingolstadt (DE)

( * ) Notice: Subject to any disclaimer, the term of this patent is extended or adjusted under 35 U.S.C. 154(b) by 484 days.

(21) Appl. No.: 18/245,524

(22) PCT Filed: Apr. 15, 2021

(86) PCT No.: PCT/EP2021/059774

§ 371 (c)(1),
(2) Date: Mar. 15, 2023

(87) PCT Pub. No.: WO2022/083899

PCT Pub. Date: Apr. 28, 2022

(65) Prior Publication Data

US 2023/0369607 A1 Nov. 16, 2023

(30) Foreign Application Priority Data

Oct. 19, 2020 (DE) ..................... 10 2020 127 463.7

(51) Int. Cl.
*H01M 4/88* (2006.01)
*H01M 4/96* (2006.01)
*H01M 8/1004* (2016.01)

(52) U.S. Cl.
CPC ....... *H01M 4/8828* (2013.01); *H01M 4/8807* (2013.01); *H01M 4/8882* (2013.01); *H01M 4/96* (2013.01); *H01M 8/1004* (2013.01)

(58) Field of Classification Search
None
See application file for complete search history.

(56) References Cited

U.S. PATENT DOCUMENTS

| | | |
|---|---|---|
| 2006/0040168 A1 | 2/2006 | Sridhar |
| 2010/0285388 A1 | 11/2010 | Schank et al. |
| 2013/0059232 A1 | 3/2013 | Jung et al. |
| 2013/0202986 A1 | 8/2013 | Moose et al. |
| 2016/0064755 A1 | 3/2016 | Hubner et al. |
| 2017/0098828 A1 * | 4/2017 | Kobilka .............. H01M 4/8878 |

(Continued)

FOREIGN PATENT DOCUMENTS

| | | | |
|---|---|---|---|
| DE | 102016218868 A1 | 3/2018 | |
| DE | 102018207133 A1 | 11/2019 | |
| EP | 3240014 A1 * | 11/2017 | .......... H01J 49/0463 |

OTHER PUBLICATIONS

WO2019207811A1andTranslation (Year: 2019).*

(Continued)

*Primary Examiner* — Brian R Ohara

(74) *Attorney, Agent, or Firm* — Seed Intellectual Property Law Group LLP

(57) ABSTRACT

A method for producing a functionalized structurized composition for a fuel cell is provided, involving: applying at least one electrode containing catalyst particles to a substrate layer in a coating step, and introducing a depth structure in an electrode surface facing away from the substrate layer in a radiation step using laser interference structurization. A membrane electrode assembly is also provided.

8 Claims, 4 Drawing Sheets

(56) References Cited

U.S. PATENT DOCUMENTS

| | | | |
|---|---|---|---|
| 2017/0256809 A1 * | 9/2017 | Moose ................ | H01M 8/1069 |
| 2020/0156934 A1 * | 5/2020 | Riveiro Rodríguez ...................... | |
| | | | B05D 1/007 |
| 2020/0243872 A1 * | 7/2020 | Kakinuma ............ | H01M 4/925 |
| 2020/0358108 A1 * | 11/2020 | Kim .................... | H01M 4/8663 |

OTHER PUBLICATIONS

Gedvilas et al., "Micro-channel drilling of Ni and Pt films on silicon by using laser beam interference ablation for solid oxide fuel cells," *Smart Nano-Micro Materials and Devices* 8204(1):1-9, Dec. 2011. (9 pages).

International Preliminary Report on Patentability, dated Jan. 13, 2023, for International Patent Application No. PCT/EP2021/059774. (6 pages).

International Search Report, mailed Jul. 20, 2021, for International Patent Application No. PCT/EP2021/059774. (2 pages).

\* cited by examiner

METHOD FOR PRODUCING A FUNCTIONALIZED STRUCTURIZED COMPOSITION FOR A FUEL CELL AND MEMBRANE ELECTRODE ASSEMBLY

BACKGROUND

Technical Field

The disclosure relates to a method for producing a functionalized structurized composition for a fuel cell, including, for example, producing a catalyst coated membrane (CCM) or a catalyst coated gas diffusion electrode (GDE). Moreover, the disclosure relates to a membrane electrode assembly.

Description of the Related Art

Fuel cell devices are used for the chemical transformation of a fuel with oxygen to form water in order to create electric energy. For this, fuel cells contain as their key component a proton-conducting (electrolyte) membrane, on the two opposite sides of which are arranged electrodes (anode and cathode). In operation of the fuel cell device having a plurality of fuel cells assembled into a fuel cell stack, the fuel, especially hydrogen ($H_2$) or a gas mixture containing hydrogen, is supplied to the anode. In the case of a mixture containing hydrogen, this is at first reformed, thus providing hydrogen. At the anode, an electrochemical oxidation of $H_2$ to $H^+$ takes place, giving off electrons. The electrons provided at the anode are taken by an electrical line to the cathode. The cathode is supplied with oxygen or a gas mixture containing oxygen, so that a reduction of $O_2$ to $O_2^-$ occurs, taking up electrons, which then becomes, together with the hydrogen protons, the product $H_2O$.

The electrode coatings in a fuel cell after being deposited on the membrane or on the gas diffusion layer must be placed in a function-ready state by a conditioning process in order to become functionally ready, during which the dry layers are reacted with water molecules, which are usually flowing in the coral-like duct structures of the dry layers. Thus, by a functionalized structurized composition is meant a layer or electrode layer which provides such a "functionalization" or affords such a functional readiness. However, the water molecule can only enter into these duct structures if the outermost layer surface has an adequate "opening" in the form of a porosity or a suitable structurization. Also, in the regular operation of the fuel cell, a sufficiently good transport must be assured for the reactants and for the product water through the individual layers of the fuel cell.

In order to adjust the porosity or to provide suitable ducts, US 2010/0 285 388 A1 proposes forming pointlike openings in the catalyst layer, which are created by a laser treatment. In DE 10 2018 207 133 A1, a laser treatment of a surface of a bipolar plate of a fuel cell is described for the purpose of suitably adjusting the wetting angle of the plate material for water. The document DE 10 2016 218 868 A1 proposes an electrical energy storage unit, the collector plate of which is provided with a structure that was incorporated in the surface using a laser.

BRIEF SUMMARY

Embodiments provide a method for producing a structurized composition for a fuel cell as well as a membrane electrode assembly resulting in an improved load bearing ability of the electrode layers under dynamic operating conditions of the fuel cell and having an improved reactant/water management.

In some embodiments, the method according to the disclosure may include:

applying at least one electrode containing catalyst particles to a substrate layer in a coating step, and introducing a depth structure in an electrode surface facing away from the substrate layer in a radiation step by laser interference structurization.

Thus, during the processing of the surface of the electrodes a laser ablation will be performed, utilizing an interference of the laser beams, resulting in uniform, nanoscale structures. Laser diodes may be used for the laser, but the use of gas lasers, such as a $CO_2$ laser, is likewise possible. Lasers emitting monochromatic radiation are preferred. Laser radiation can be pulsed or continuous with at least one of the wavelengths 266 nm, 355 nm, 532 nm or 1064 nm.

This depth structure results in a network on the electrode surface and improves the channeled supply and removal of the operating media. Hydrogen and oxygen are distributed more homogeneously and quickly in the surface through the channel structures and the product water can be drained more quickly and with less pressure through the structures. Volume flow rates dependent on the operating point can be adjusted more quickly, so that the fuel cell device outfitted with such a fuel cell responds more quickly to desired load point changes. The structural-mechanical tension and compression loads on the electrode coatings can be supported during operation with less tendency to form cracks, because the structures introduced better distribute the load peaks over the surface as expansion notches and do not stress the material with any excessively high tension peaks.

The depth structure introduced using the laser interference structurization can also enlarge the actively opened electrode surface, so that the media can penetrate into or be removed from the deeper electrode layers at significantly more sites.

In order to reduce the amount of heat put into the material as much as possible, in some embodiments, the laser interference structurization may be done with laser pulses lying in the picosecond range or the femtosecond range. The depth of the depth structure amounts to 100 nm to 100 μm, for example, preferably 10 μm, or less than 1 μm, while the individual ducts of the depth structure can have a spacing of 500 nm to 500 μm, or as little as 50 μm, so that the depth structure is present in the form of a micrometer structure or submicrometer structure.

The depth structure can be realized or formed already in a membrane electrode assembly which is produced on the basis of a decal process, in which case the electrode structurization may take place after the hot press transfer step on the membrane substrate layer, and the following removal of the substrate film.

However, it is also possible for one or both of the electrodes to be applied directly to the membrane and therefore a catalyst-coated membrane (CCM) will be present. In this regard, it may be advantageous when the electrode is provided in the form of an ink prior to the coating step, containing carbon-substrated catalyst particles and at least one ionomer binder, and the ink is applied to the substrate layer during the coating step. Since a change in the structure depths may occur during the sequential application and drying of the two electrodes, the structurization of the two electrodes should occur only after the final drying of the second electrode.

In order to incorporate the depth structure in the electrode surface in a stable and robust manner, it may be advantageous when the electrode is dried in a drying step before the depth structure is introduced into the electrode surface.

In many cases, however, a shortening of the fabrication time is desirable, so that one will seek to shorten the cycle time for the production of multiple membrane electrode assemblies or gas diffusion layers. It may be advisable to start drying only the marginal layer, i.e., the electrode surface which is going to receive the structurization, before the depth structure is introduced, as long as the drying occurs from the side facing away from the substrate layer. In this regard, in order to optimize the drying process, it may be advisable for the electrode to be only partly dried in a drying step, and for the depth structure to be introduced into the already drying electrode surface already prior to the complete drying of the electrode in order to facilitate the material transfers of the evaporating ink solvent in the drying process and enlarge the contact surface with the layer being dried for the drying agent (preferably, hot dry air). However, it may happen that flammable vapors will be created during the (partial) drying process, so that in order to ensure the process safety the depth structure will only be introduced outside of a drying unit.

To form a catalyst-coated membrane, the substrate layer is formed from a proton-conducting membrane material. This substrate layer may have a multilayered composition, with a strengthening layer at its foundation, based on or consisting of EPTFE, for example. On this proton-conducting strengthening layer there is deposited an ionomer layer on both sides, for example, made of PTFE or PFSA, so that the proton-conducting membrane material thus exhibits a strengthened sandwich composition.

Alternatively, the substrate layer for the electrode can also be formed from a material of a gas diffusion layer, so that the coating with the electrode forms a gas diffusion electrode, which has likewise been provided with a depth structure. In this regard, the sequence of process steps can therefore be reversed, so that at first the depth structure is incorporated in the electrode material, and then the electrode is applied to the gas diffusion layer, for example, in a decal process. Hence, the depth structure is present on a surface of the electrode facing toward the gas diffusion layer. The electrode is thus deposited on a decal foil and dried. Next comes the structurization and, in the calendaring step, this surface is deposited on the gas diffusion layer.

The benefits, embodiments, and effects explained in connection with the methods described herein hold equally for the membrane electrode assembly described herein. A membrane electrode assembly may be formed with a proton-conducting membrane and electrodes arranged on either side of the membrane, wherein at least one, preferably both of the electrodes, have a depth structurization using laser interference structurization on their electrode surface facing away from the membrane.

Also disclosed is a gas diffusion electrode, which consists of a carbon-containing material and which has been coated with an electrode material containing catalyst particles. This electrode is also provided on its electrode surface facing the gas diffusion layer with a depth structure, which has been incorporated using a laser interference structurization in a radiation step. The gas diffusion layer may be produced with the method described herein, the sequence of the steps being reversed and a decal process being used to apply the electrode to the gas diffusion layer.

The features and combinations of features mentioned above in the description and the features and combinations of features mentioned below in the description of the figures and/or shown solely in the figures can be used not only in the particular indicated combination, but also in other combinations or standing alone. Thus, embodiments which are not shown explicitly or explained in the figures, yet which can be created and emerge from separated combinations of features from the explained embodiments should be viewed as also being disclosed and encompassed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
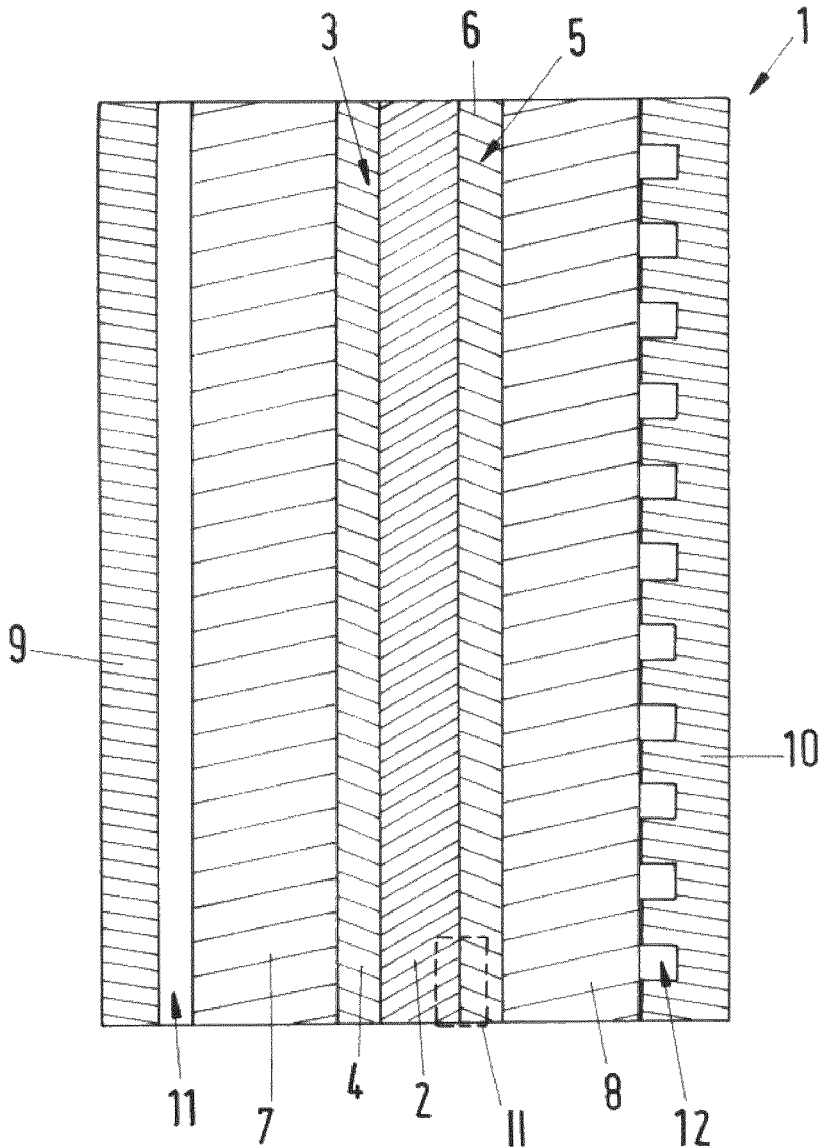
FIG. 1 shows a schematic representation of the composition of a fuel cell.

FIG. 1 shows a fuel cell 1. A semipermeable electrolyte membrane 2 made from a proton-conducting membrane material is covered on a first side 3 with a first electrode 4, in the present case the anode, and on a second side 5 with a second electrode 6, in the present case the cathode. The first electrode 4 and the second electrode 6 comprise substrate particles 14, on which are arranged or substrated catalyst particles 13 of precious metals or mixtures containing precious metals, such as platinum, palladium, ruthenium or the like. These catalyst particles 13 serve as reaction accelerators in the electrochemical reaction of the fuel cell 1. The substrate particles 14 may contain carbon. However, substrate particles 14 formed from a metal oxide or carbon with an appropriate coating may also be considered. In such a polymer electrolyte membrane fuel cell (PEM fuel cell), fuel or fuel molecules, especially hydrogen, are split up into protons and electrons at the first electrode 4 (anode). The electrolyte membrane 2 lets through the protons (such as $H^+$), but is impenetrable to the electrons ($e^-$). The electrolyte membrane 2 in this embodiment is formed from an ionomer, such as a sulfonated tetrafluorethylene polymer (PTFE) or a polymer of perfluorinated sulfonic acid (PFSA). At the anode the following reaction occurs: $2H_2 \rightarrow 4H^+ + 4e^-$ (oxidation/electron surrender).

While the protons pass through the electrolyte membrane 2 to the second electrode 6 (cathode), the electrons are taken by an external circuit to the cathode or to an energy accumulator. A cathode gas, especially oxygen or air containing oxygen, is provided at the cathode, so that the following reaction occurs here: $O_2 + 4H^+ + 4e^- \rightarrow 2H_2O$ (reduction/electron uptake).

In the present case, the electrodes 4, 6 are each associated with a gas diffusion layer 7, 8, one gas diffusion layer 7 being associated with the anode and the other gas diffusion layer 8 with the cathode. Furthermore, the gas diffusion layer 7 on the anode side is associated with a flow field plate, configured as a bipolar plate 9, to supply the fuel gas, having a fuel flow field 11. Using the fuel flow field 11, the fuel is supplied through the gas diffusion layer 7 to the electrode 4. At the cathode side, the gas diffusion layer 8 is associated with a flow field plate having a cathode gas flow field 12, likewise configured as a bipolar plate 10, for the supply of the cathode gas to the electrode 6.

The electrodes 4, 6 in the present case are formed with a multitude of catalyst particles 13, which can be formed as nanoparticles, for example, as core-shell nanoparticles. These have the advantage of a large surface, with the precious metal or the precious metal alloy arranged only on the surface, while a metal of lesser value, such as nickel or copper, forms the core of the nanoparticle.

Figure 2:
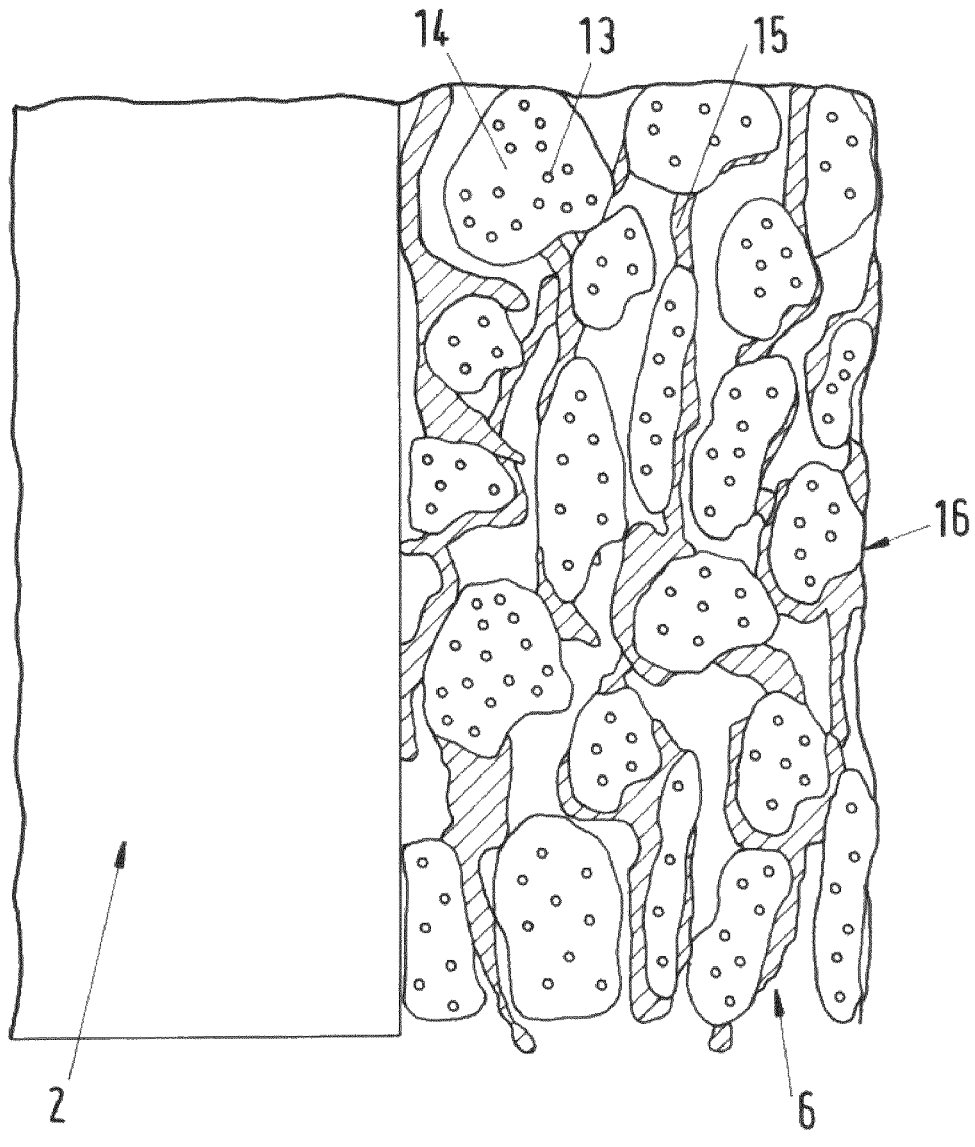
FIG. 2 shows a schematic detail view of an electrode from FIG. 1.

With the aid of FIG. 2 it can be recognized that the catalyst particles 13 are arranged or substrated on a multitude of electrically conductive substrate particles 14. Furthermore, between the substrate particles 14 and/or the catalyst particles 13 there is an ionomer binder 15, which is formed from the same material as the membrane 2. This ionomer binder 15 is formed as a polymer or ionomer containing perfluorinated sulfonic acid. The ionomer binder 15 in the present case is present in a porous form, having a porosity greater than 30 percent. This ensures, especially on the cathode side, that the oxygen diffusion resistance is not increased, thereby making possible a smaller loading of the catalyst particle 13 with precious metal or a smaller loading of the substrate particle 14 with catalyst particles 13. The distribution and the flow behavior of the operating media in the fuel cell 1 have a significant influence on the efficiency.

A method described herein is for producing a composition structurized with a depth structure 16 for the fuel cell 1, resulting in improved efficiency of the fuel cell 1 during operation or also during its preconditioning. In the method, at least one of the two electrodes 4, 6 containing catalyst particles 13 is applied to a substrate layer in a coating step. Next, the depth structure 16 is introduced into an electrode surface facing away from the substrate layer in a radiation step using a laser interference structurization. The radiation step using the laser interference structurization is done with laser pulses lying in the picosecond region or in the femtosecond region, in order to ensure little input of heat into the material and to form predetermined uniform structures.

The material of the substrate layer can be the material from which the gas diffusion layers 7, 8 are formed. In this way, a gas diffusion electrode (GDE) formed with the depth structure 16 is produced, for which a decal process will be used to apply the electrode layer on the gas diffusion layer 7, 8. But the material of the substrate layer can also be the material from which the proton-conducting electrolyte membrane 2 is formed. In this way, one obtains a membrane electrode assembly (CCM) formed with the depth structure 16. The proton-conducting membrane material 20 is present as a multilayered composition, in which a strengthening layer (such as one made of EPTFE) is covered on both sides with an ionomer layer (such as PTFE or PFSA).

Figure 3:
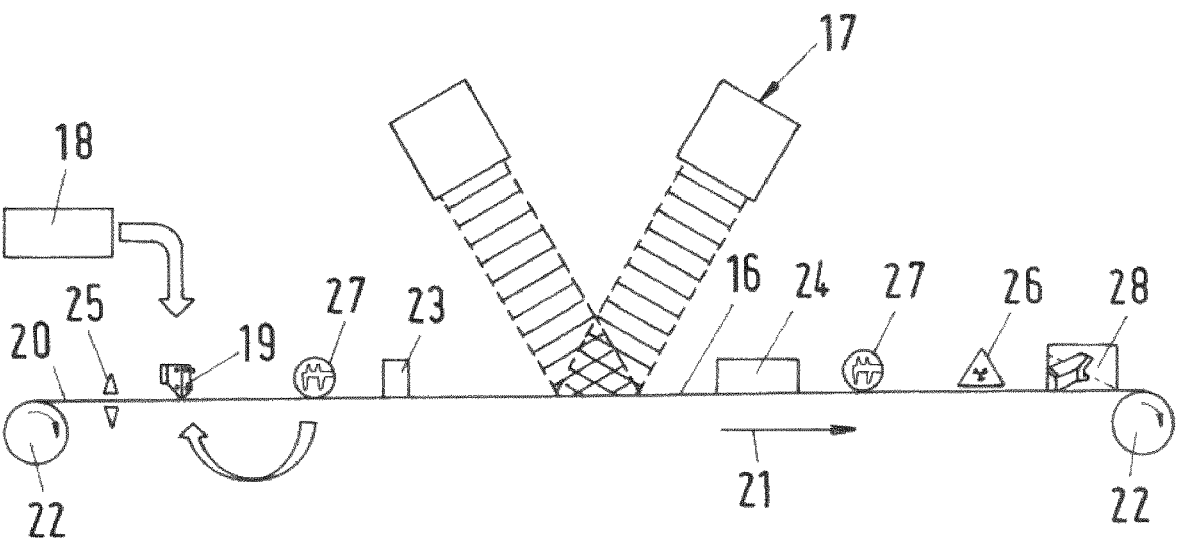
FIG. 3 shows a schematic representation of a device for producing a catalyst-coated membrane in a side view.

FIG. 3 presents the method—merely as an example—in the form of a continuous process for making a catalyst-coated membrane. Here, a weblike proton-conducting membrane material 20 provided on a roll 22 is unwound and taken in a conveyor direction 21 at first to a film cleaning unit 25, where the membrane material 20 is cleaned free of dust and deposits. Next, the membrane material 20 is transported further in the conveyor direction 21 to an applicator tool 19, with which an ink 18 for the electrodes 4, 6 is applied on at least a segment, preferably entirely, on the membrane material 20. In the conveyor direction 21 after the first applicator tool 17, a measurement of the thickness of the layer of ink 18 is done using a layer thickness measuring device 27. In the conveyor direction 21 following the layer thickness measuring device 27, there is provided an intermediate drying unit 23, in order to dry the ink 18. The intermediate drying unit 23 is designed to only partly dry the ink 18 (with the drying starting from the side facing away from the substrate layer), in order to form a dry marginal film there, before the depth structure 16 is introduced using a following laser device 17 in the conveyor direction 21 using the laser interference structurization in the electrode surface which is facing away from the membrane material 20. However, the intermediate drying unit 23 can also first dry the ink 18 entirely, before the depth structure 16 is introduced. Following the laser device 17 in the conveyor direction 21, a further drying unit 24 may be present, which is designed to dry entirely the membrane material 20 coated with the ink 18 and provided with the depth structure 16. The drying unit 24 is followed by a further layer thickness measuring device 27 in the conveyor direction 21, which can measure the dried electrode film, for example, using an optical layer thickness measurement head. In addition, an X-ray fluorescence analysis unit 26 is present, which determines the load of catalyst particles of the membrane material 20 coated with the ink 18, and the fraction of the substrated catalyst particles 13 in the ink 18 can then be adjusted as a function of the measured catalyst particle load. Before the coated membrane material 20 is rolled up once more on the other roller 22, it is taken past a unit for defect marking 28, with which any holes present in the electrode layers or the like can be marked so that during a following slicing of the membrane material into individual catalyst-coated membranes these are prevented from having a defective coating.

Alternatively, the method can also be modified such that the substrate layer, such as the layer of the membrane material 20 or the layer of the material of the gas diffusion layers 7, 8, is covered with the electrodes 4, 6 in a decal process. For this, the particular electrode 4, 6 is provided on a substrate film prior to the coating step, and the foil-substrated electrode 4, 6 is applied to the substrate layer during the coating step. After this, the substrate film is detached.

Figure 4:
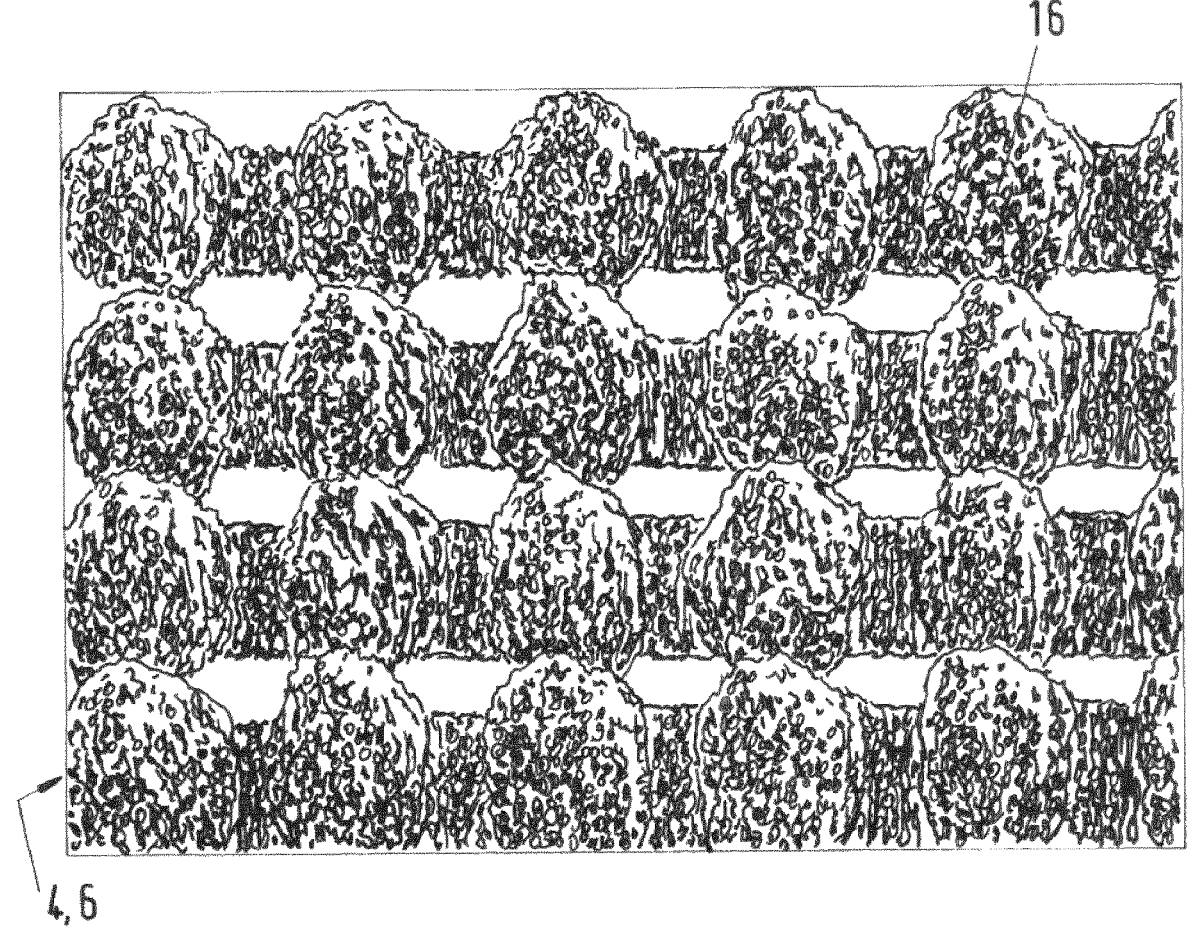
FIG. 4 shows a microscopic top view of the electrode surface of the electrodes provided with the depth structure.

FIG. 4 shows the electrode surface, having been provided with a depth structurization 16. The arrangement of the cavities shown is merely an example, but a uniform distribution and homogenization of individual flow ducts is present. Typically, the depth of the individual cavities is 100 nm to 100 µm, preferably up to 10 µm, preferably less than 1 µm. They are spaced apart from each other by 500 nm to 500 µm, preferably by up to 50 µm, so that the depth structure 16 is present as a micrometer structure of submicrometer structure.

As a result, with the method described herein it is possible to provide the electrode surfaces in very fast manner with a structurization resulting in a better distribution of the operating media. It is possible to form two-beam interference patterns or also three-beam interference patterns, resulting in a better duct formation, which results in a better exchange of media. The catalyst-coated membrane described herein is also distinguished by a better water management. The method can be carried out quickly, reducing the cycle time for the production of the individual fuel cells. Such fuel cells can be produced on an industrial scale and can be provided in large lot numbers.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a functionalized structurized composition for a fuel cell, comprising:

applying at least one electrode containing catalyst particles to a substrate layer in a coating step; and introducing a depth structure in an electrode surface facing away from the substrate layer in a radiation step by laser interference structurization, wherein the depth structure comprises a network of intersecting channels including a plurality of channels extending in a first direction and a plurality of channels extending in a second direction that is perpendicular to the first direction, wherein the electrode is only partly dried in a drying step to form a dried marginal layer of the electrode that includes the electrode surface that faces away from the substrate layer, and the depth structure is introduced into the dried marginal layer of the electrode prior to complete drying of the electrode to increase an exposed surface area of the electrode, and wherein, after the depth structure is introduced into the dried marginal layer of the electrode, the electrode is completely dried in a subsequent drying step, which is aided by the increase in the exposed surface area of the electrode provided by the introduction of the depth structure.

2. The method according to claim 1, wherein the laser interference structurization is done with laser pulses lying in the picosecond range or the femtosecond range.

3. The method according to claim 1, wherein the electrode is provided prior to the coating step on a substrate film, the film-substrated electrode is applied to the substrate layer during the coating step, and after which the substrate film is removed.

4. The method according to claim 1, wherein the electrode is provided in the form of an ink prior to the coating step, containing carbon-substrated catalyst particles and at least one ionomer binder, and the ink is applied to the substrate layer during the coating step.

5. A method for producing a functionalized structurized composition for a fuel cell, comprising:

applying at least one electrode containing catalyst particles to a substrate layer in a coating step; and introducing a depth structure in an electrode surface facing away from the substrate layer in a radiation step by laser interference structurization, wherein the electrode is only partly dried in a drying step to form a dried marginal layer of the electrode that includes the electrode surface that faces away from the substrate layer, and the depth structure is introduced into the dried marginal layer of the electrode prior to complete drying of the electrode to increase an exposed surface area of the electrode, and wherein, after the depth structure is introduced into the dried marginal layer of the electrode, the electrode is completely dried in a subsequent drying step, which is aided by the increase in the exposed surface area of the electrode provided by the introduction of the depth structure.

6. The method according to claim 1, wherein the substrate layer is formed from a proton-conducting membrane material.

7. The method according to claim 6, wherein the proton-conducting membrane material is a multilayered composition in which a strengthening layer is coated on both sides with an ionomer layer.

8. The method according to claim 1, wherein the substrate layer is formed from a material of a gas diffusion layer.

* * * * *